(12) United States Patent
Takagi

(10) Patent No.: US 7,949,312 B2
(45) Date of Patent: May 24, 2011

(54) BI-AXIAL SWIVEL ASSEMBLY IN ELECTRONIC APPARATUS

(75) Inventor: Hisamitsu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 782 days.

(21) Appl. No.: 11/241,918

(22) Filed: Oct. 4, 2005

(65) Prior Publication Data
US 2006/0293095 A1 Dec. 28, 2006

(30) Foreign Application Priority Data

Jun. 28, 2005 (JP) ................................. 2005-189016

(51) Int. Cl.
H04B 1/38 (2006.01)
H04M 1/00 (2006.01)
(52) U.S. Cl. ............... 455/90.3; 455/575.3; 379/433.11; 379/433.13
(58) Field of Classification Search ............... 455/575.3, 455/90.3; 379/433.11, 433.13, 443.04
See application file for complete search history.

(56) References Cited

U.S. PATENT DOCUMENTS

| | | | | |
|---|---|---|---|---|
| 6,549,789 B1 * | 4/2003 | Kfoury | ...................... | 455/550.1 |
| 6,798,646 B2 * | 9/2004 | Hsu | ................ | 361/681 |
| 6,965,413 B2 * | 11/2005 | Wada | ............................ | 348/376 |
| 7,006,853 B2 * | 2/2006 | Kang et al. | ................. | 455/575.3 |
| 7,094,059 B2 * | 8/2006 | Obermeyer | ....................... | 439/6 |
| 7,130,186 B2 * | 10/2006 | Yu | ................................ | 361/681 |
| 7,136,687 B2 * | 11/2006 | Chang | ......................... | 455/575.3 |
| 7,139,596 B2 * | 11/2006 | SanGiovanni | ............. | 455/575.1 |
| 7,158,816 B1 * | 1/2007 | Mizuta et al. | ............... | 455/575.3 |
| 7,168,135 B2 * | 1/2007 | Jung et al. | ....................... | 16/367 |
| 7,174,195 B2 * | 2/2007 | Nagamine | ................. | 455/575.1 |
| 7,212,845 B2 * | 5/2007 | Ikeuchi | ..................... | 455/575.3 |
| 7,266,864 B2 * | 9/2007 | Kim | ............................... | 16/367 |

FOREIGN PATENT DOCUMENTS

| | | |
|---|---|---|
| JP | 11-30226 | 2/1999 |
| JP | 2000-240636 A | 9/2000 |
| JP | 2005-23958 | 1/2005 |
| KR | 10-2005-0052171 | 6/2005 |

OTHER PUBLICATIONS

Korean Office Action of Nov. 10, 2006 w/English translation.
JPO, Office Action mailed by Japan Patent Office on Feb. 9, 2010, in connection with JP patent application No. 2005-189016, a counterpart to the instant application.

* cited by examiner

Primary Examiner — Yuwen Pan

(57) ABSTRACT

A bi-axial swivel assembly allows the rotation of a bracket around the longitudinal axis of a support shaft when the restriction cam lies inside an imaginary reference plane. The attitude of the bracket is allowed to change around the longitudinal axis of the support shaft. Only if the bracket allows the restriction cam get off a recess, the perpendicular surface serves to prevent the restriction cam from protruding outside the imaginary reference plane. The attitude of the bracket can be prevented from changing around the rotation axis perpendicular to the longitudinal axis. The bi-axial swivel assembly allows the wire to penetrate through first and second hollow spaces. When the bracket rotates around the longitudinal axis, the wire is only forced to suffer from a slight torsion within the first hollow space. The wire can be protected from a larger flexure.

6 Claims, 12 Drawing Sheets

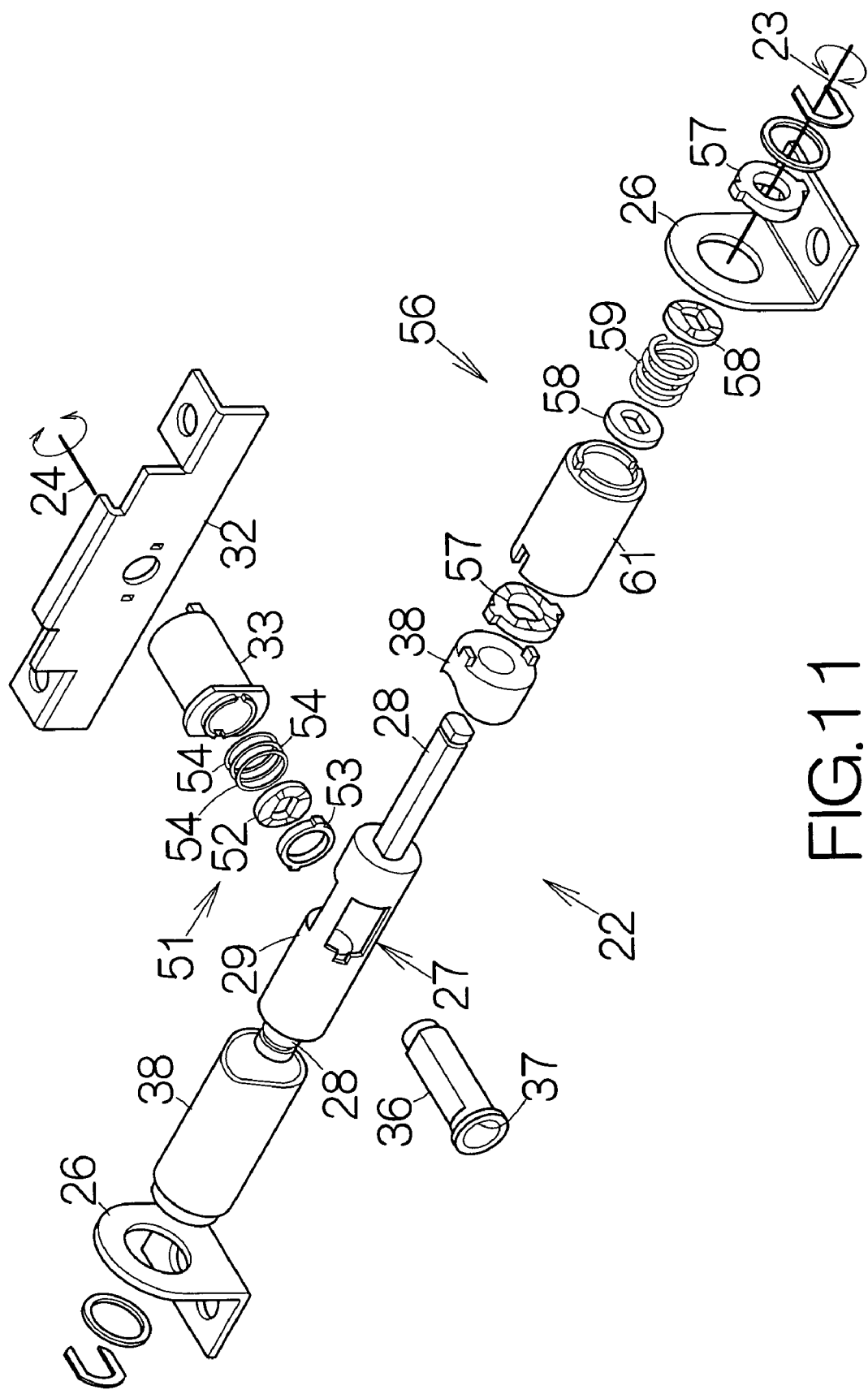

BI-AXIAL SWIVEL ASSEMBLY IN ELECTRONIC APPARATUS

BACKGROUND OF THE INVENTION

1. Field of the Invention

The present invention relates to an electronic apparatus such as a cellular or mobile phone terminal. In particular, the invention relates to a cellular phone terminal of a so-called flip or clamshell type.

2. Description of the Prior Art

A cellular or mobile phone terminal of a so-called clamshell type, including a bi-axial swivel assembly, is well known as disclosed in Japanese Patent Application Publication 2005-023958. The cellular phone terminal includes a main enclosure and a display enclosure. The bi-axial swivel assembly includes a support shaft fixed to the main enclosure. A support member is supported on the support shaft for relative rotation. A bracket is coupled to the support member for relative rotation around the rotation axis perpendicular to an imaginary plane including the longitudinal axis of the support shaft. The display enclosure is coupled to the bracket.

An annular groove is formed around the support shaft. A pair of parallel imaginary planes serve to define the opposite sides of the groove. The imaginary planes extend perpendicular to the longitudinal axis of the support shaft. Recesses are defined in the sides of the groove at a predetermined angular position. The recesses in cooperation defines an enlarged section of the groove. When the display enclosure takes a standard attitude, a cam member integral with the bracket is located inside a space between the parallel imaginary planes. The cam member is allowed to move along the groove over the entire length. The bracket is allowed to rotate around the support shaft over an angular range of 180 degrees, for example. When the display enclosure rotates around the rotation axis by 90 degrees from the standard attitude, the cam member protrudes outside a space between the parallel imaginary planes. The cam member is only allowed to move in the groove within the enlarged section. The rotation of the display enclosure is thus restricted around the support shaft. Moreover, the standard attitude of the display enclosure can always be maintained when the cam member stays outside the enlarged section in the groove.

Electric connection must be established between the display enclosure and the main enclosure in the aforementioned cellular phone terminal. A wire is wound around the bracket in the direction around the rotation axis so as to establish the electric connection. The wire is forced to suffer from a larger flexure every time the display enclosure or bracket rotates around the rotation axis. The wire is also forced to suffer from a larger flexure every time the display enclosure rotates around the support shaft. The wire in this manner suffer from a frequent load.

SUMMARY OF THE INVENTION

It is accordingly an object of the present invention to provide a bi-axial swivel assembly capable of relieving a load applied to a wire.

According to a first aspect of the present invention, there is provided a bi-axial swivel assembly comprising: a pair of coaxial bearings located at positions distanced from each other; a pair of support shafts respectively supported on the bearings for relative rotation; a first hollow space extending at least within one of the support shafts in the axial direction of the support shaft, said first hollow space penetrating through the bearing corresponding to the one of the support shafts; a support member interposed between the support shafts, said support member coupled with the support shafts based on integral formation; a tube supported on the support member, said tube extending along the rotation axis perpendicular to an imaginary plane including the longitudinal axis of the support shaft; a second hollow space extending within the tube in the axial direction of the tube, said second hollow space penetrating through at least the support member; a bracket supported on the tube for relative rotation around the rotation axis; a perpendicular surface defined on at least one of the bearings along an imaginary reference plane perpendicular to the longitudinal axis of the support shaft; a restriction cam coupled to the bracket, said restriction cam extending in the centrifugal direction of the rotation axis, said restriction cam lying inside the imaginary reference plane when the bracket takes a first attitude, said restriction cam protruding outside the imaginary reference plane when the bracket takes a second attitude established through rotation by 90 degrees around the rotation axis from the first attitude; and a recess formed on the perpendicular surface, said recess receiving the restriction cam protruding outside the imaginary reference plane.

The bi-axial swivel assembly allows the rotation of the bracket and support shafts around the longitudinal axis of the support shaft as long as the restriction cam lies inside the imaginary reference plane. The attitude of the bracket is allowed to change relative to the bearings around the longitudinal axis of the support shaft. Only if the restriction cam is located off the recess, the perpendicular surface serves to prevent the restriction cam from protruding outside the imaginary reference plane. The restriction cam is prevented from rotation around the rotation axis. The attitude of the bracket can also be prevented from changing around the rotation axis. On the other hand, when the restriction cam is positioned within the recess, the restriction cam is allowed to protrude outside the imaginary reference plane through the rotation around the rotation axis. The bracket is thus allowed to rotate around the rotation axis over the angular range of 90 degrees. The attitude of the bracket is allowed to change around the rotation axis at specific position around the longitudinal axis of the support shaft.

The bi-axial swivel assembly allows the wire to penetrate through the first and second hollow spaces. Even in the case where the bracket rotates around the longitudinal axis of the support shaft, the wire is only forced to suffer from a slight torsion within the first hollow space. The wire can be protected from a larger flexure. Even in the case where the bracket rotates around the rotation axis, the wire is only forced to suffer from a slight torsion within the second hollow space. The wire can be protected from a larger flexure also in this case. The wire can in this manner relieved from a load to the utmost. Disconnection and short of the wire can be avoided.

The support member may support the tube at a position off the longitudinal axis of the support shaft in the bi-axial swivel assembly. The bi-axial swivel assembly of the type enables a reliably provision of the first hollow space on the longitudinal axis of the support shaft. This enables the location of the wire closest to the longitudinal axis of the support shaft. The wire is thus reliably prevented from a larger flexure.

The bi-axial swivel assembly of the type can be incorporated into an electronic apparatus such as a cellular or mobile phone terminal. The cellular phone terminal may comprise: first and second enclosures; a pair of coaxial bearings attached to the first enclosure at positions distanced from each other; a pair of support shafts respectively supported on the bearings for relative rotation; a first hollow space extending at least within one of the support shafts in the axial direction of the support shaft, said first hollow space penetrating through the bearing corresponding to the one of the support shafts; a support member interposed between the support shafts, said support member coupled with the support shafts based on integral formation; a tube supported on the support member, said tube extending along the rotation axis perpendicular to an imaginary plane including the longitudinal axis of the support shaft; a second hollow space extending within the tube in the axial direction of the tube, said second hollow space penetrating through at least the support member; a bracket supported on the tube for relative rotation around the rotation axis; a perpendicular surface defined on at least one of the bearings along an imaginary reference plane perpendicular to the longitudinal axis of the support shaft; a restriction cam coupled to the bracket, said restriction cam extending in the centrifugal direction of the rotation axis, said restriction cam lying inside the imaginary reference plane when the bracket takes a first attitude, said restriction cam protruding outside the imaginary reference plane when the bracket takes a second attitude established through rotation by 90 degrees around the rotation axis from the first attitude; and a recess formed on the perpendicular surface, said recess receiving the restriction cam protruding outside the imaginary reference plane.

BRIEF DESCRIPTION OF THE DRAWINGS

The above and other objects, features and advantages of the present invention will become apparent from the following description of the preferred embodiments in conjunction with the accompanying drawings, wherein:

FIG. 11 is an exploded view schematically illustrating the structure of the bi-axial swivel mechanism;

DESCRIPTION OF THE PREFERRED EMBODIMENTS

Figure 1:
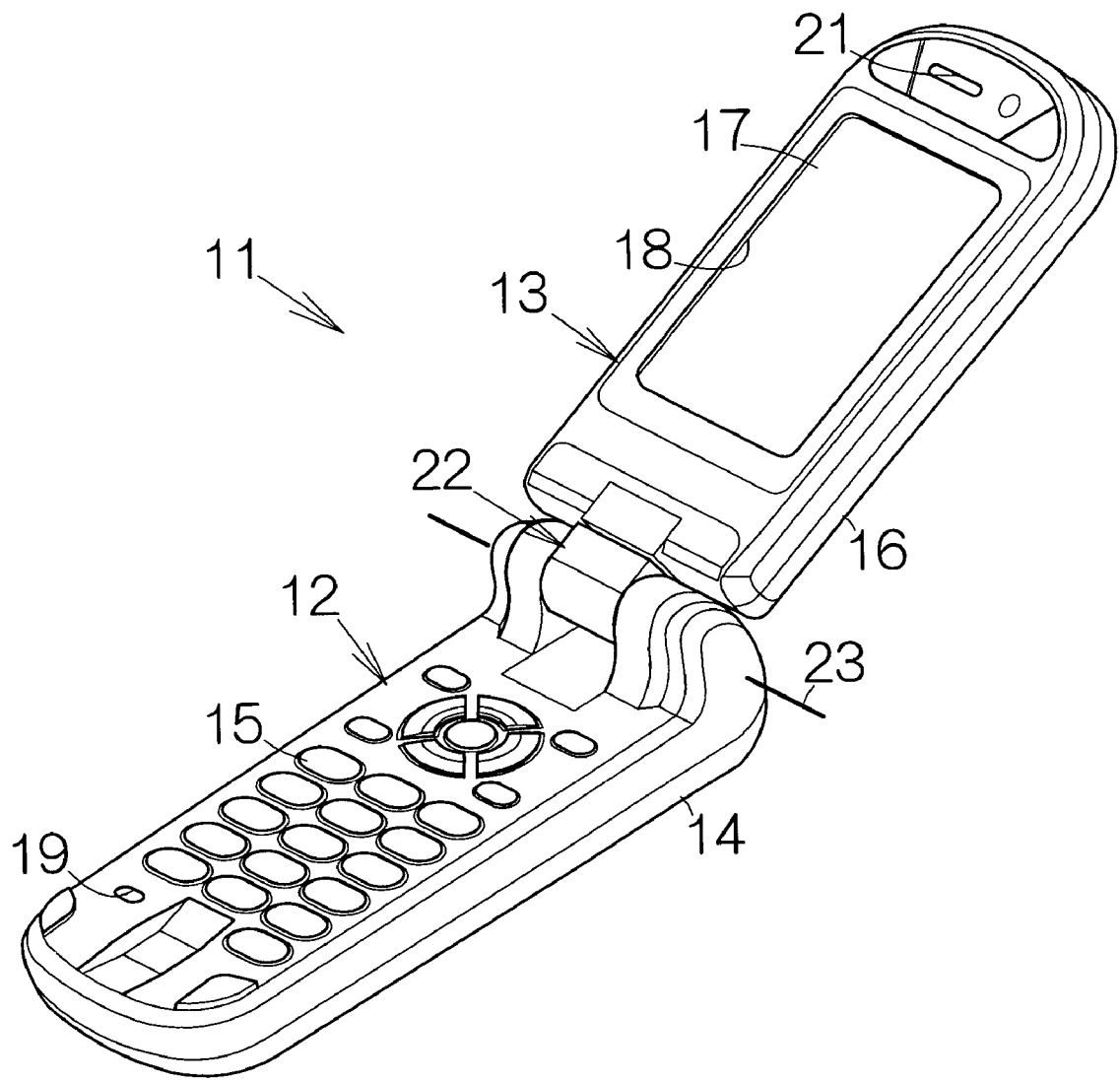
FIG. 1 is a perspective view schematically illustrating a cellular or mobile phone terminal as an example of an electronic apparatus.

FIG. 1 schematically illustrates a cellular or mobile phone terminal 11 of a so-called flip or clamshell type as an example of an electronic apparatus. The cellular phone terminal 11 includes a transmitter 12 and a receiver 13. The transmitter 12 has a main enclosure 14 serving as a first enclosure according to the present invention. A printed circuit board, not shown, is incorporated within the main enclosure 14. Processing circuits, such as a central processing unit (CPU) and a memory, are mounted on the printed circuit board as conventionally known. Input keypads 15, such as an on-hook key, an off-hook key, ten keys, and the like, are embedded in the front flat surface of the transmitter 12. The CPU operates in response to the manipulation of the input keypads 15. The main enclosure 14 may be molded from a reinforced resin material, for example.

The receiver 13 has a display enclosure 16 serving as a second enclosure according to the present invention. A flat display panel such as a liquid crystal display (LCD) panel 17 is incorporated within the display enclosure 16. A screen opening 18 is defined in the front flat surface of the display enclosure 16. The screen of the LCD panel 17 is placed within the screen opening 18. Various texts and graphics are displayed on the screen of the LCD panel 17 in response to the operation of the CPU. The display enclosure 16 may be molded from a reinforced resin material, for example.

The microphone hole 19 is defined in the front flat surface of the main enclosure 14. A microphone is embedded in the microphone hole 19. A speaker hole 21 is defined in the front flat surface of the display enclosure 16. A speaker is embedded in the speaker hole 21. The user of the cellular phone terminal 11 talks to the microphone so as to establish a voice call. The speaker reproduces the voice of the other side.

The transmitter 12 is coupled to the receiver 13 through a bi-axial swivel mechanism 22. The swivel mechanism 22 realizes the rotation around a horizontal axis 23 between the transmitter 12 and the receiver 13. The horizontal axis 23 is set in parallel with the front flat surface of the main enclosure 14 at the end of the front flat surface of the main enclosure 14. The rotation around the horizontal axis 23 enables superposition of the receiver 13 over the transmitter 12. The phone flip is in this manner closed in the cellular phone terminal 11. The screen of the LCD panel 17 is overlaid on the front flat surface of the main enclosure 14.

Figure 2:
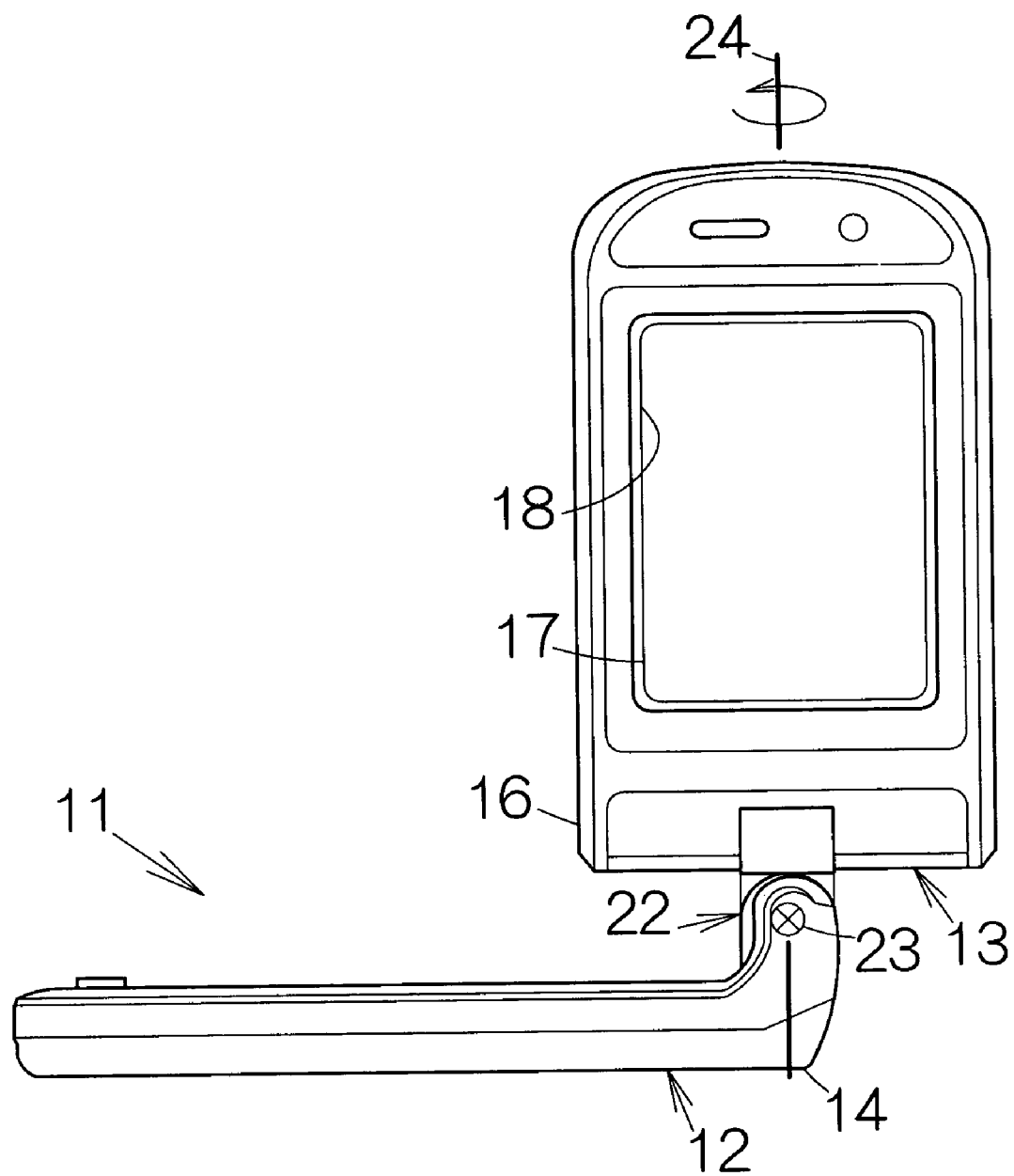
FIG. 2 is a side view schematically illustrating a display enclosure rotating around a vertical axis in an upright attitude on a main enclosure.

As is apparent from FIG. 2, the swivel mechanism 22 also realizes the rotation around a vertical axis 24 between the transmitter 12 and the receiver 13. The vertical axis 24 is set in parallel with the front flat surface of the display enclosure 16. The vertical axis 24 is allowed to rotate around the horizontal axis 23 in an attitude set perpendicular to the horizontal axis 23. The back surface of the receiver 13 is allowed to face forward through the rotation around the vertical axis 24. When the cellular phone terminal 11 is then folded through the rotation around the horizontal axis 23, the screen of the LCD panel 17 is exposed outward.

Figure 3:
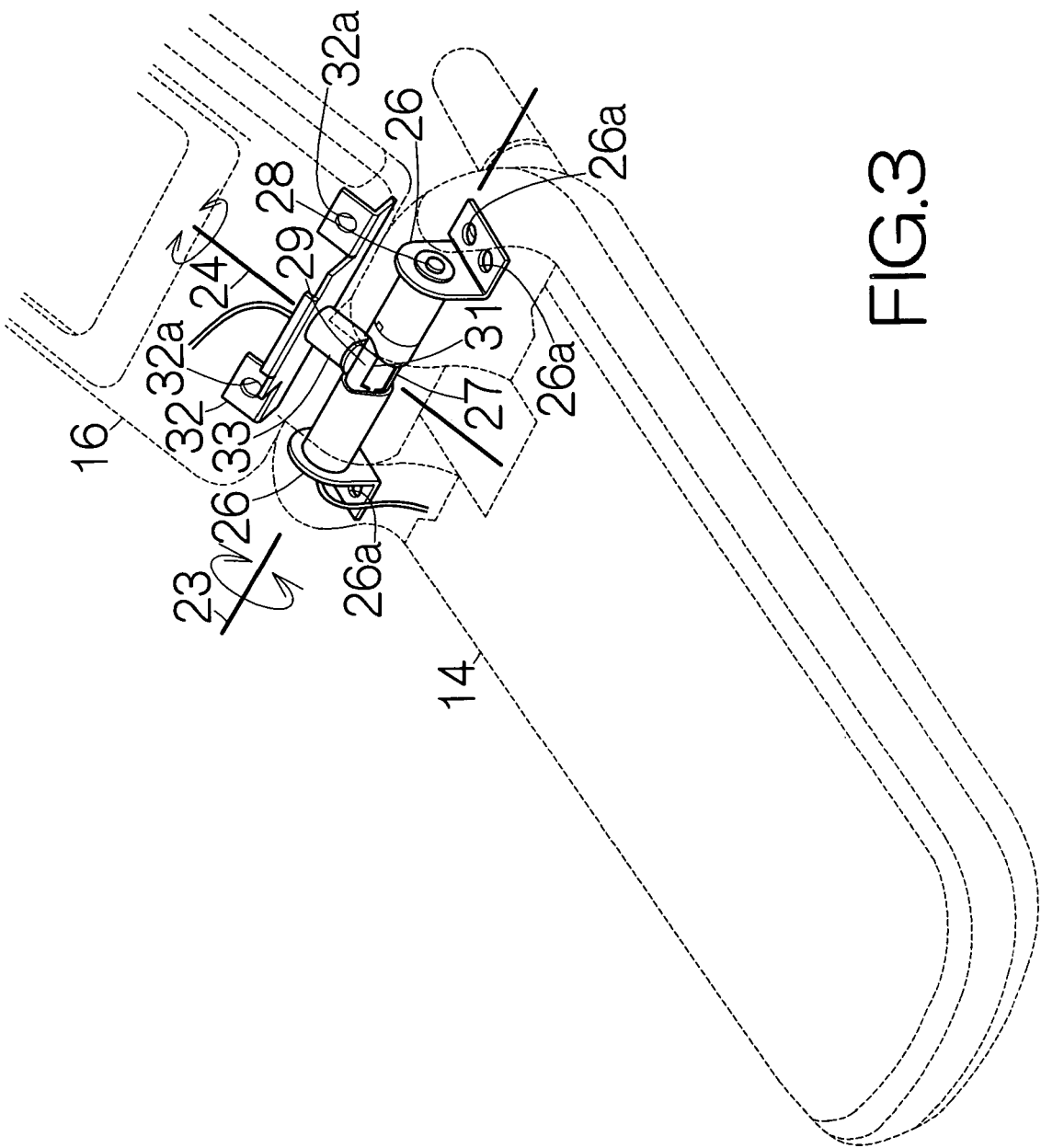
FIG. 3 is a perspective view schematically illustrating the structure of a bi-axial swivel mechanism according to a first embodiment of the present invention from a front viewpoint.

As shown in FIG. 3, the swivel mechanism 22 includes a pair of sockets or bearings 26, 26 according to a first embodiment of the present invention. The bearings 26 are located at coaxial positions distanced from each other. The bearings 26 may be punched out of a metallic plate, for example. The bearings 26 are fixed to the main enclosure 14. Screws, not shown, are employed for fixation of the bearings 26, for example. The screws penetrate through corresponding screw holes 26a for engagement of the tip ends with the main enclosure 14.

A shaft member 27 is supported on the bearings 26 for relative rotation. The shaft member 27 includes a pair of support shafts 28, 28 respectively supported on the corresponding bearings 26. A support member 29 is located between the support shafts 28, 28 at a position off the longitudinal axis of the shaft member 27. An inside space 31 is defined around the longitudinal axis of the shaft member 27 at a position adjacent to the support member 29. The support member 29 is coupled with the support shafts 28, 28 based on integral formation. The support member 29 and the support shafts 28, 28 in this manner form the shaft member 27 as a one-piece component. The longitudinal axis of the shaft member 27 corresponds to the aforementioned horizontal axis 23.

A bracket 32 is coupled to the support member 29 for relative rotation around the aforementioned vertical axis 24. The bracket 32 is coupled to the display enclosure 16. Screws, not shown, are employed to connect the bracket 32 to the display enclosure 16, for example. The screws penetrate through screw holes 32a for engagement of the tip ends with the display enclosure 16.

A shaft cover or sleeve 33 is located between the bracket 32 and the support member 29. The sleeve 33 is immobilized to the bracket 32. Specifically, when the bracket 32 rotates around the vertical axis 24, the sleeve 33 is forced to rotate around the vertical axis 24 along with the bracket 32.

Figure 4:
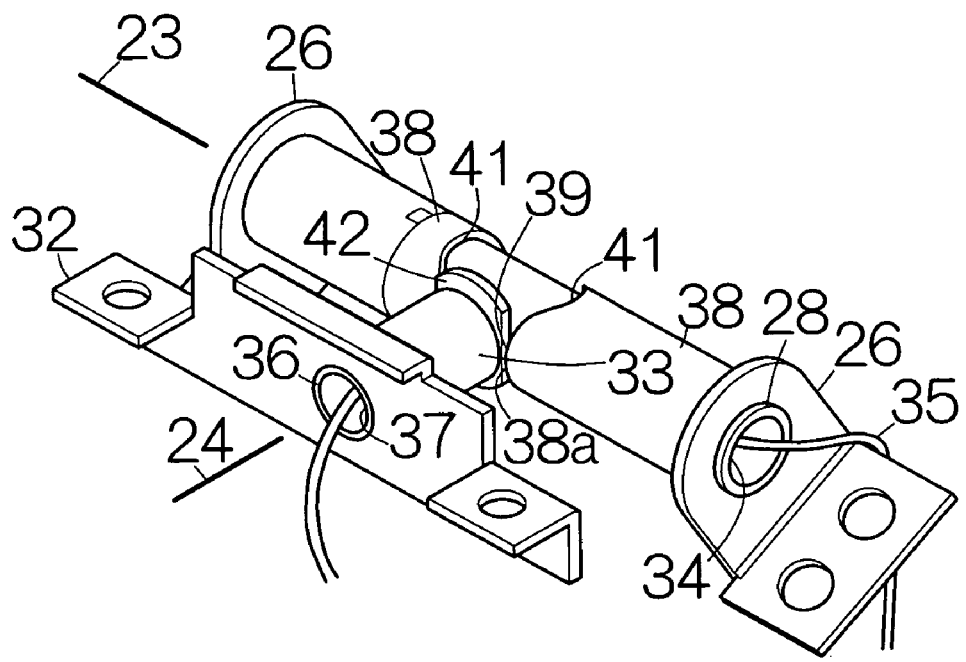
FIG. 4 is a perspective view schematically illustrating the structure of the bi-axial swivel mechanism from a rear viewpoint.

As is apparent from FIG. 4, a first hollow space 34 is define in one of the support shafts 28. The first hollow space 34 is designed to penetrate through the support shaft 28 along the horizontal axis 23. The first hollow space 34 thus penetrates through the corresponding bearing 26. The inner end of the first hollow space 34 opens in the aforementioned inside space 31 of the support member 29. A coaxial cable 35 can thus be guided from the inside space 31 toward the outside of the bearing 26 through the first hollow space 34.

As shown in FIG. 4, the bracket 32 is attached to a tube 36 for relative rotation around the vertical axis 24. The tube 36 is fixed to the support member 29 in a coaxial relation with the vertical axis 24. A second hollow space 37 is defined in the tube 36. The second hollow space 37 penetrates through the tube 36 in the axial direction of the tube 36. The inner end of the second hollow space 37 opens in the aforementioned inside space 31 of the support member 29. The coaxial cable 35 can thus be guided from the inside space 31 toward the outside of the bracket 32 through the second hollow space 37. The coaxial cable 35 is consequently guided from the bearing 26 to the bracket 32 along the horizontal axis 23 and the longitudinal axis of the tube 36.

A cam member 38 is mounted on each of the support shafts 28. The cam member 38 is immobilized to the corresponding bearing 26. The cam members 38 are designed to respectively define perpendicular surfaces 38a, 38a opposed to each other. The perpendicular surfaces 38a are defined along parallel reference planes perpendicular to the horizontal axis 23, respectively. The perpendicular surfaces 38a define a groove 39 extending around the horizontal axis 23. The groove 39 has a uniform width.

A recess 41 is formed on the individual perpendicular surface 38a at a predetermined angular position. The recesses 41, 41 serve to define an enlarged section in the groove 39. The angular position of the recesses 41 may depend on the position of the vertical axis 24 or sleeve 33 established when the receiver 13 is set upright from the transmitter 12, as shown in FIG. 2.

Figure 5:
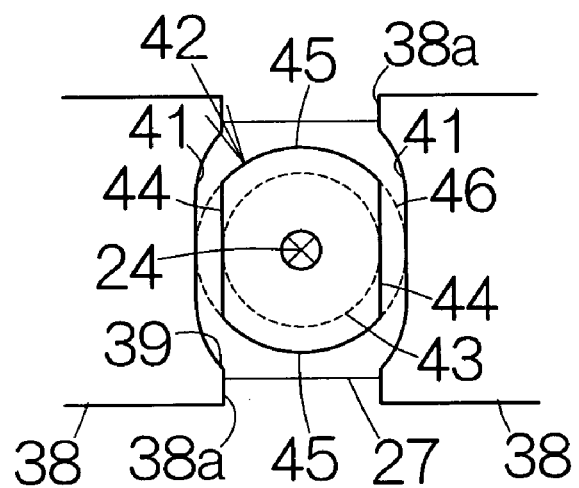
FIG. 5 is an enlarged plan view schematically illustrating the relationship between a restriction cam and cam members designed to restrict the rotation of the display enclosure around the vertical axis.

A restriction cam 42 is formed on the outer periphery of the sleeve 33. The restriction cam 42 is designed to extend in the centrifugal direction of the vertical axis 24. The restriction cam 42 is defined around the vertical axis 24 based on the outline of the sleeve 33. As shown in FIG. 5, parallel flat surfaces 44, 44 are defined on the restriction cam 42. The parallel flat surfaces 44, 44 respectively extend within parallel imaginary planes set tangent to an imaginary cylinder 43 coaxial to the vertical axis 24. The parallel imaginary planes are set perpendicular to the horizontal axis 23. The diameter of the imaginary cylinder 43 is set in accordance with the distance between the parallel reference planes. When the parallel flat surfaces 44, 44 lie inside a space between the parallel reference planes, the restriction cam 42 is allowed to move along the groove 39 over the entire length.

The restriction cam 42 allows establishment of curved surfaces 45, 45 between the parallel flat surfaces 44, 44. The curved surfaces 45 are located outside the imaginary cylinder 43. A large-seized imaginary cylinder 46 coaxial to the vertical axis 24 may be described to form the curved surfaces 45, 45. The diameter of the large-sized imaginary cylinder 46 may be set equal to the extent of the enlarged section of the groove 39.

Figure 6:
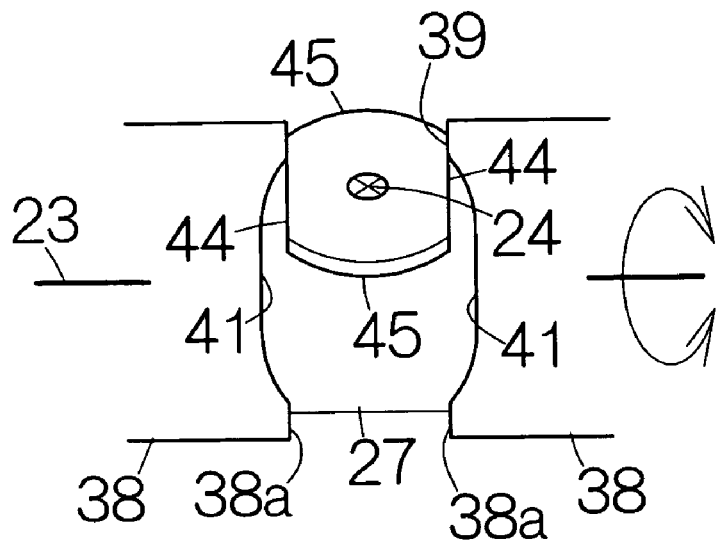
FIG. 6 is an enlarged plan view schematically illustrating the relationship between the restriction cam and the cam members when the display enclosure rotates around the horizontal axis.

When the receiver 13 and the transmitter 12 are widely opened as shown in FIG. 1, the bracket 32 is positioned at a first position around the horizontal axis 23 as shown in FIG. 3. The bracket 32 takes a standard attitude around the vertical axis 24 prior to the positioning around the horizontal axis 23. In this case, the flat surfaces 44 of the restriction cam 42 are respectively set in parallel with the parallel reference planes, as shown in FIG. 6, the flat surfaces 44 stay in a space between the parallel reference planes. The bracket 32 is thus allowed to rotate around the horizontal axis 23. Here, the bracket 32 is completely prevented from rotation around the vertical axis 24.

Figure 7:
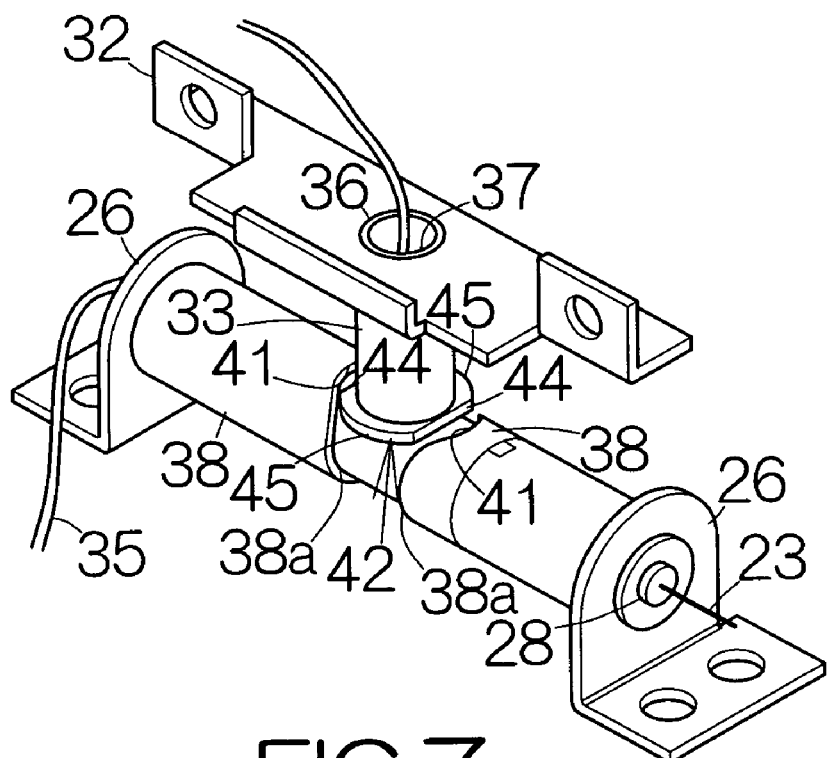
FIG. 7 is a perspective view schematically illustrating the structure of the bi-axial swivel mechanism keeping a bracket in an upright attitude around the horizontal axis.
Figure 8:
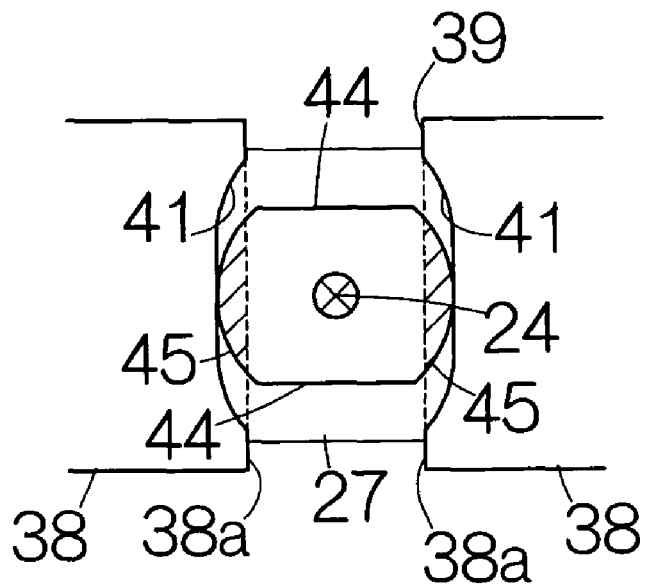
FIG. 8 is an enlarged plan view schematically illustrating the restriction cam rotating around the vertical axis when the swivel mechanism keeps the bracket in the upright attitude.
Figure 9:
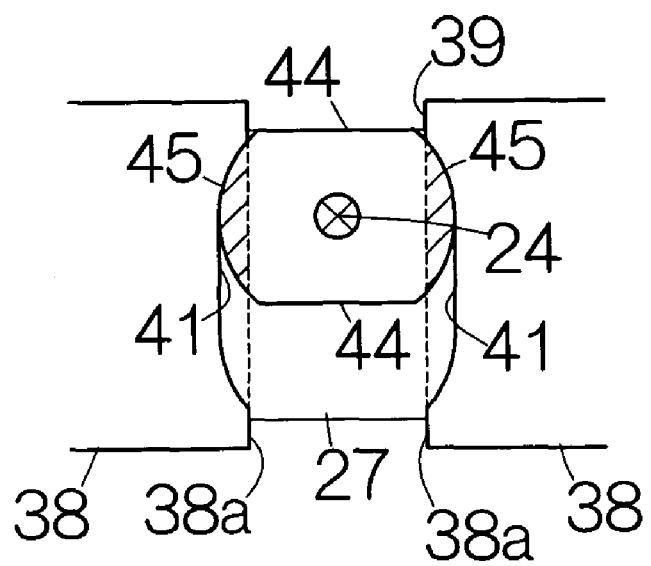
FIG. 9 is an enlarged plan view schematically illustrating the restriction cam contacting with the cam members when the display enclosure rotates around the horizontal axis.

When the receiver 13 is set to stand upright from the transmitter 12 as shown in FIG. 2, the bracket 32 is positioned at a second position around the horizontal axis 23 as shown in FIG. 7. The restriction cam 42 is in this case located in the enlarged section of the groove 39 as shown in FIG. 5. The enlarged section allows the rotation of the restriction cam 42 around the vertical axis 24. This enables the rotation of the bracket 32 namely the display enclosure 16 around the vertical axis 24. The bracket 32 thus takes a halfway attitude around the vertical axis 24. The restriction cam 42 protrudes outside a space between the parallel reference planes as shown in FIG. 8, for example. The movement of the restriction cam 42 is restricted within the enlarged section of the groove 39 as is apparent from FIG. 9. The bracket 32 namely the display enclosure 16 is thus prevented from rotation around the horizontal axis 23. The display enclosure 16 of the halfway attitude is reliably prevented from colliding against the main enclosure 14. The main enclosure 14 is surely prevented from damages caused by such collision or contact.

Figure 10:
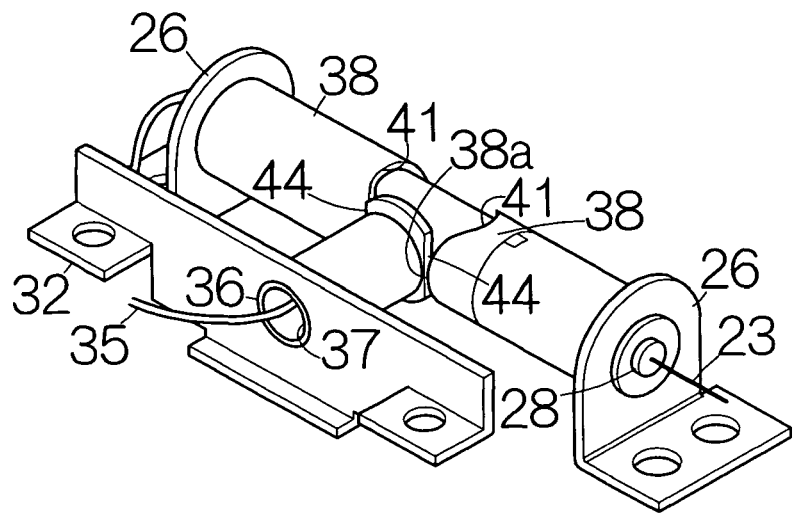
FIG. 10 is a perspective view schematically illustrating the structure of the bi-axial swivel mechanism when the bracket rotates farthest around the horizontal axis.

When the receiver 13 is overlaid on the transmitter 12, the bracket 32 is positioned at a third position around the horizontal axis 23 as shown in FIG. 10. The bracket 32 is forced to take the standard attitude around the vertical axis 24 prior to the positioning around the horizontal axis 23 in the same manner as described above. The flat surfaces 44, 44 of the restriction cam 42 are located in a space between the parallel reference planes as described above. The bracket 32 is thus allowed to rotate around the horizontal axis 23. The bracket 32 namely the display enclosure 16 is completely prevented from rotation around the vertical axis 24. This serves to reliably prevent collision or contact between the receiver 13 and the transmitter 12 in response to the rotation around the vertical axis 24.

Here, a further detailed description will be made on the structure of the swivel mechanism 22. A first rotation restriction mechanism 51 is established between the tube 36 and the sleeve 33, as shown in FIG. 11. The first rotation restriction mechanism 51 includes an annular stationary cam member 52 coupled to the tube 36 for immobility relative to the tube 36 around the vertical axis 24. The stationary cam member 52 may tightly be mounted around the tube 36. An annular movable cam member 53 is superposed on the stationary cam member 52. The movable cam member 53 may be mounted around the tube 36 for relative rotation around the vertical axis 24. The movable cam member 53 is coupled to the sleeve 33. A relative rotation is prevented between the movable cam member 53 and the sleeve 33 around the vertical axis 24. A Bellville spring 54 is interposed between the bracket 32 and the movable cam member 53. The Bellville spring 54 serves to urge the stationary cam member 52 against the movable cam member 53. The stationary cam member 52, the movable cam member 53 and the Bellville spring 54 are received in the inside space of the sleeve 33.

A second rotation restriction mechanism 56 is established between the cam member 38 and the bearing 26 around one of the support shafts 28. The second rotation restriction mechanism 56 includes an annular stationary cam member 57 mounted around the support shaft 28 for relative rotation around the horizontal axis 23. A movable cam member 58 is superposed on the stationary cam member 57. The movable cam member 58 may be coupled with the support shaft 28 for immobility relative to the support shaft 28 around the horizontal axis 23. A coil spring 59 is interposed between the bearing 26 and the movable cam member 58. The coil spring 59 serves to urge the movable cam member 58 against the stationary cam member 57. The stationary cam member 57, the movable cam member 58 and the coil spring 59 are received in the inside space of a cam casing 61. The cam casing 61 is coupled to the bearing 26 for immobility relative to the bearing 26 around the horizontal axis 23. The stationary cam member 57 may likewise be coupled to the cam casing 61 for immobility relative to the cam casing 61 around the horizontal axis 23.

Figure 12:
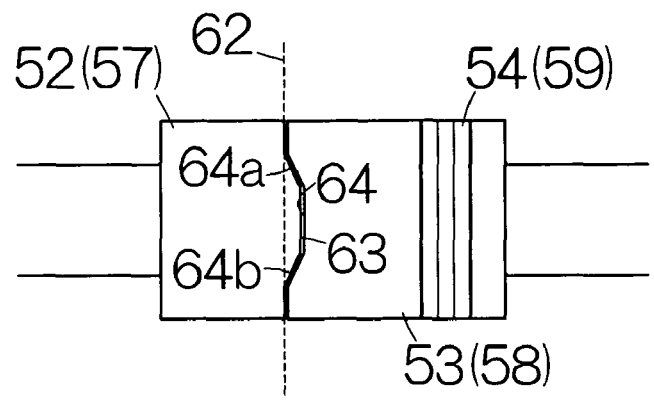
FIG. 12 is a schematic view schematically illustrating relationship between a stationary cam member and a movable cam member.

As shown in FIG. 12, a swell 63 is formed on the stationary cam member 52, 57. The swell 63 swells toward the corresponding movable cam member 53, 58 from an imaginary plane 62 perpendicular to the horizontal axis 23 or the vertical axis 24. A depression 64 is formed on the movable cam member 53, 58. The depression 64 retreats from the imaginary plane 62. The depression 64 includes first and second inclined surfaces 64a, 64b. The first inclined surface 64a is formed to extend upward from the bottom of the depression 64 toward the imaginary plane 62 around the horizontal axis 23 or the vertical axis 24. The inclined surface 64a extends upward from the bottom surface of the depression 64 toward the imaginary plane 62. The second inclined surface 64b is formed to extend downward from the imaginary plane 62 toward the bottom of the depression 64. The shape of the depression 64 may correspond with that of the swell 63. Since the Bellville spring 54 or the coil spring 59 serves to urge the movable cam member 53, 58 against the stationary cam member 52, 57, the swell 63 received in the depression 64 enables restriction to a relative rotation of the movable cam member 53, 58. This results in a clicking movement of the movable cam member 53, 58.

Figure 13:
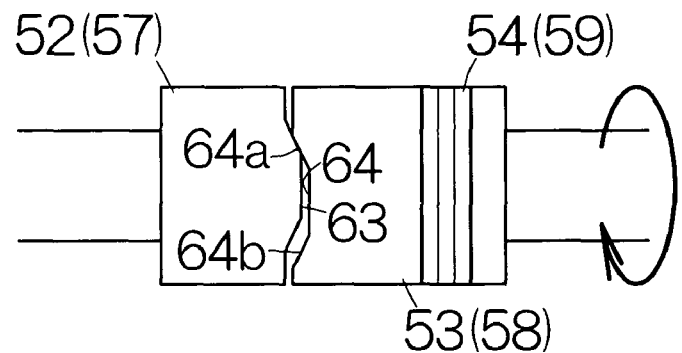
FIG. 13 is a schematic view schematically illustrating the relationship between the stationary cam member and the movable cam member.

When the movable cam member 53, 58 rotates in response to the rotation of the display enclosure 16 or the bracket 32, as shown in FIG. 13, for example, the swell 63 of the stationary cam member 52, 57 slides along the first inclined surface 64a of the movable cam member 53, 58. The movable cam member 53, 58 is distanced from the stationary cam member 52, 57 in response to the rotation of the movable cam member 53, 58 based on the inclination of the first inclined surface 64a. Elastic force is thus stored up in the Belleville spring 54 or the coil spring 59 in response to the movement of the movable cam member 53, 58. The movable cam member 53, 58 is in this manner urged against the stationary cam member 52, 57. If restraint is released from the display enclosure 16 or the bracket 32 around the horizontal axis 23 or the vertical axis 24, the first inclined surface 64a develops a driving force in the reverse direction around the horizontal axis 23 or the vertical axis 24. The driving force is kept developed until the swell 63 is completely received in the depression 64. The display enclosure 16 is in this manner allowed to enjoy an elastic restriction to the movement around the horizontal or vertical axis 23, 24.

Figure 14:
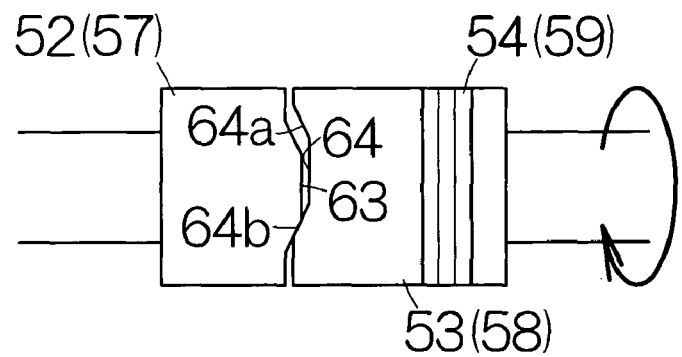
FIG. 14 is a schematic view schematically illustrating the relationship between the stationary cam member and the movable cam member.

When the swell 63 of the stationary cam member 52, 57 reaches the second inclined surface 64b in the adjacent depression 64, as shown in FIG. 14, the inclination of the second inclined surface 64b allows the movable cam member 53, 58 to approach the stationary cam member 52, 57 during the rotation of the movable cam member 53, 58. In this case, the second inclined surface 64b develops a driving force acting on the movable cam member 53, 58 for rotation. If restraint is released from the display enclosure 16 or the bracket 32 around the horizontal axis 23 or the vertical axis 24, the movable cam member 53, 58, namely the display enclosure 16, is thus forced to rotate around the vertical or horizontal axis 24, 23 until the swell 63 is completely received in the depression 64. The movement of the swell 63 is restricted within the adjacent depressions 64, 64.

Figure 15:
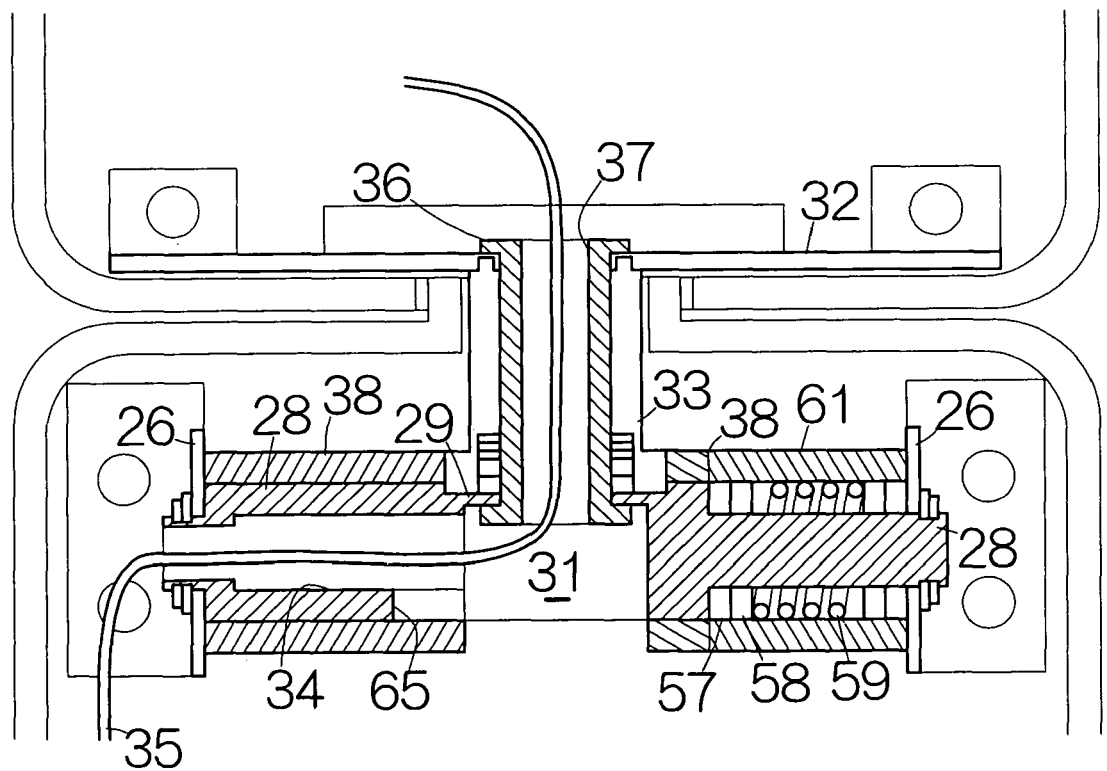
FIG. 15 is a sectional view taken along an imaginary plane including the vertical axis.

As shown in FIG. 15, a gap 65 may further be formed in the support shaft 28. The gap 65 is continuous with the inside space 31. The gap 65 serves to establish a wider opening of the first hollow space 34. The assembling of the coaxial cable 35 can thus be accomplished with a higher efficiency.

Figure 16:
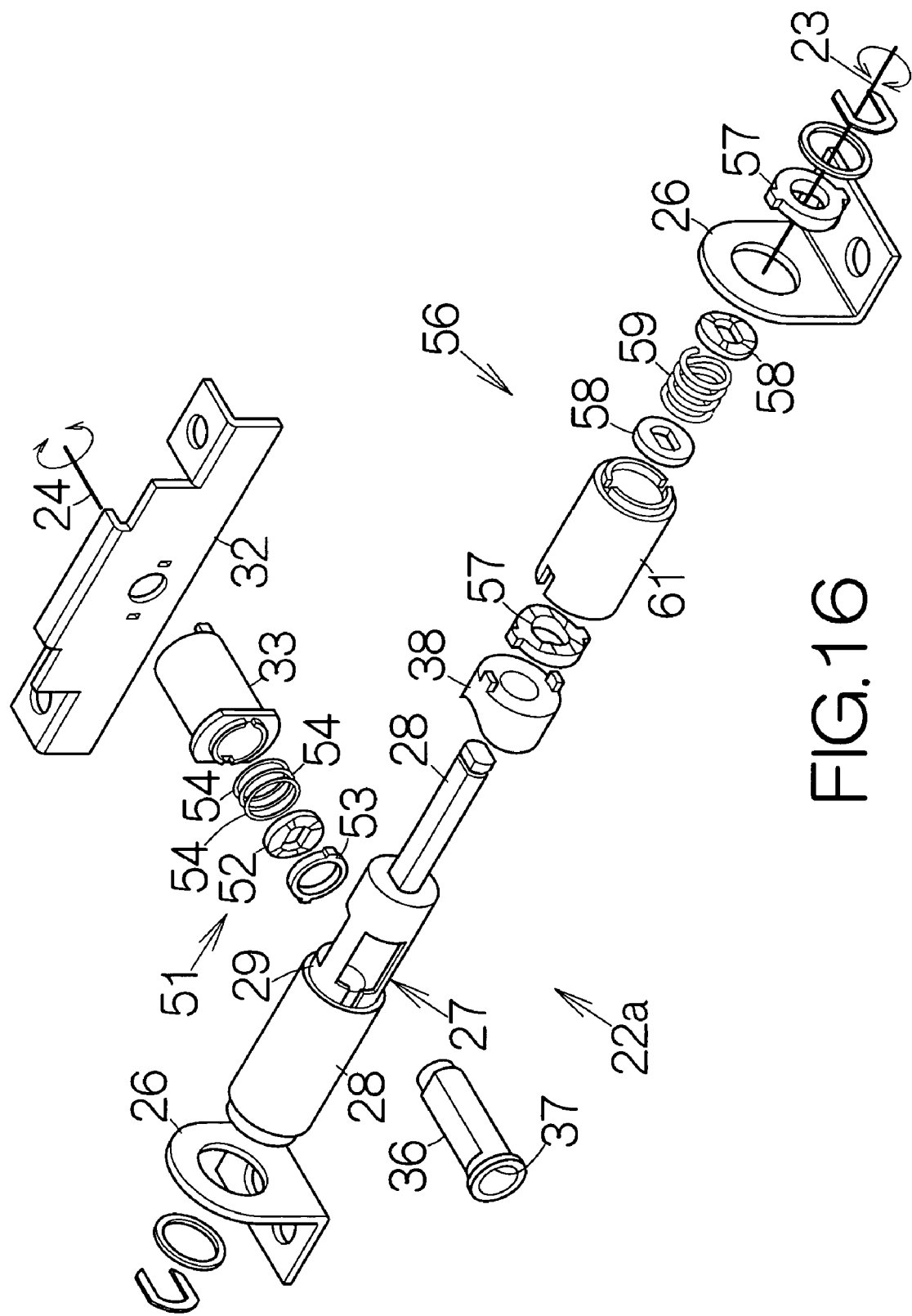
FIG. 16 is an exploded view schematically illustrating the structure of a bi-axial swivel mechanism according to a second embodiment of the present invention.

FIG. 16 schematically illustrates a swivel mechanism 22a according to a second embodiment of the present invention. The swivel mechanism 22b allows provision of the cam member 38 only on one of the support shafts 28. The cam member 38 may be coupled to the bearing 26 for immobility relative to the bearing 26 around the horizontal axis 23 with the assistance of the cam casing 61 in the manner as described above. The first hollow space 34 is defined in the other support shaft 28 as described above. The second hollow space 37 is defined in the tube 36. Like reference numerals are attached to structure or components equivalent to those of the aforementioned first embodiment.

Figure 17:
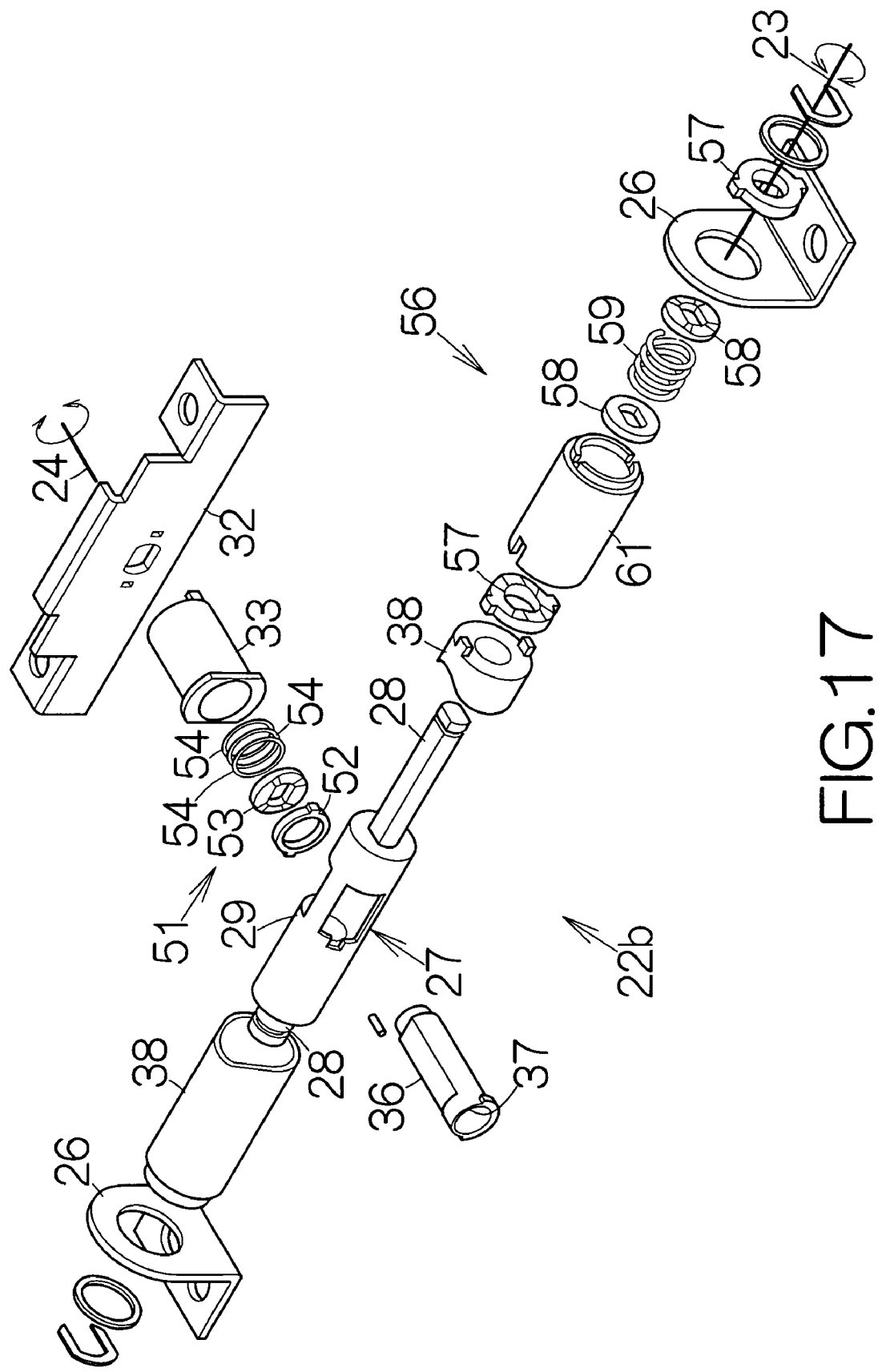
FIG. 17 is an exploded view schematically illustrating the structure of a bi-axial swivel mechanism according to a third embodiment of the present invention.

FIG. 17 schematically illustrates a swivel mechanism 22b according to a third embodiment of the present invention. The tube 36 is supported on the shaft member 27 or support member 29 for relative rotation around the vertical axis 24 in this swivel mechanism 22b. The tube 36, the sleeve 33, the movable cam member 53 and the bracket 32 are thus forced to rotate all together. The stationary cam member 52 may be coupled to the support member 29 for immobility relative to the support member 29 around the vertical axis 24. The first hollow space 34 is defined in the support shaft 28 in the same manner as described above. The second hollow space 37 is defined in the tube 36. Like reference numerals are attached to structure or components equivalent to those of the aforementioned first embodiment. The cam member 38 may be mounted only on one of the support shafts 28 in the swivel mechanism 22b in the same manner as the aforementioned second embodiment.

Figure 18:
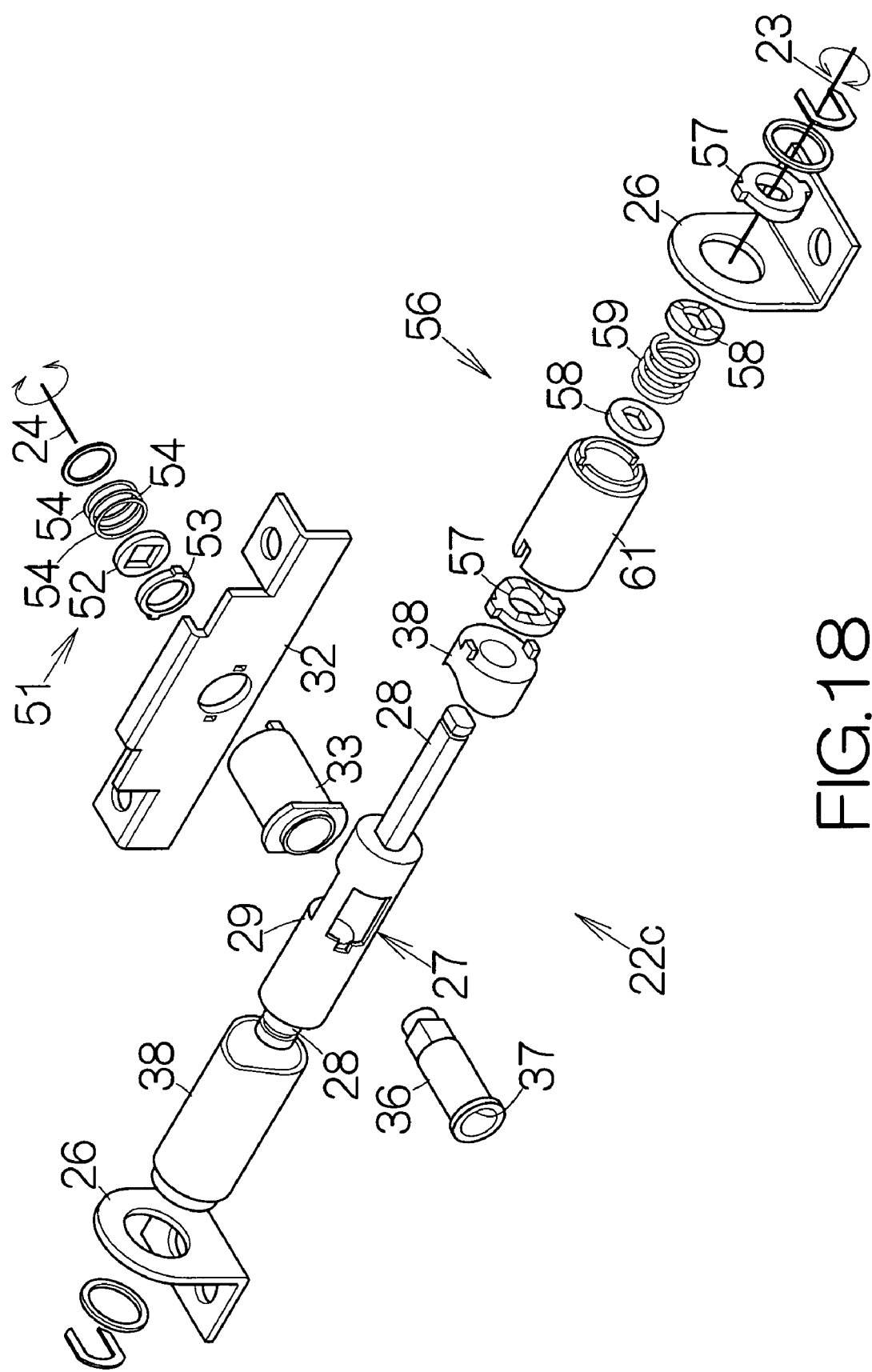
FIG. 18 is an exploded view schematically illustrating the structure of a bi-axial swivel mechanism according to a fourth embodiment of the present invention.

FIG. 18 schematically illustrates a swivel mechanism 22c according to a fourth embodiment of the present invention. The swivel mechanism 22c allows provision of the first rotation restriction mechanism 51 outside the sleeve 33. The first hollow space 34 is defined in the support shaft 28 in the same manner as described above. The second hollow space 37 is defined in the tube 36. Like reference numerals are attached to structure or components equivalent to those of the aforementioned first embodiment. The cam member 38 may be mounted only on one of the support shafts 28 in the swivel mechanism 22c in the same manner as the aforementioned second embodiment. The movable cam member 53, the sleeve 33 and the bracket 32 may be forced to rotate all together around the vertical axis 24. Otherwise, the tube 36 may also be forced to rotate around the vertical axis 24 along with the movable cam member 53, the sleeve 33 and the bracket 32.

What is claimed is:

1. A bi-axial swivel assembly comprising:
    a pair of coaxial bearings located at positions distanced from each other;
    a pair of support shafts respectively supported on the coaxial bearings for relative rotation;
    a first hollow space extending at least within one of the support shafts in an axial direction of the support shafts, the first hollow space penetrating through the bearing corresponding to the one of the support shafts;
    a support member interposed between the support shafts, the support member coupled with the support shafts based on integral formation;
    a tube supported on the support member, the tube extending along a rotation axis perpendicular to an imaginary plane including a longitudinal axis of the support shafts;
    a second hollow space extending within the tube in an axial direction of the tube, the second hollow space penetrating through at least the support member, the second hollow space being connected to the first hollow space;
    a shaft cover supported on the tube for relative rotation around the rotation axis;
    a bracket coupled to the shaft cover;
    perpendicular surfaces defined on the bearings along imaginary reference planes perpendicular to the longitudinal axis of the support shafts, respectively;
    a restriction cam coupled to the shaft cover, the restriction cam extending in a centrifugal direction of the rotation axis, the restriction cam lying inside the imaginary reference planes when the bracket takes a first attitude, the restriction cam protruding outside at least one of the imaginary reference planes when the bracket takes a second attitude established through rotation by 90 degrees around the rotation axis from the first attitude; and
    recesses formed on the perpendicular surfaces, respectively, the recesses receiving the restriction cam protruding outside the imaginary reference planes.

2. The bi-axial swivel assembly according to claim 1, wherein the support member supports the tube at a position off the longitudinal axis of the support shafts.

3. The bi-axial swivel assembly of claim 1, wherein the recesses define an enlarged section in a groove extending around the longitudinal axis of the support shafts, the groove being defined by the perpendicular surfaces.

4. A cellular phone terminal comprising:
    first and second enclosures;
    a pair of coaxial bearings attached to the first enclosure at positions distanced from each other;
    a pair of support shafts respectively supported on the coaxial bearings for relative rotation;
    a first hollow space extending at least within one of the support shafts in an axial direction of the support shafts, the first hollow space penetrating through the bearing corresponding to the one of the support shafts;
    a support member interposed between the support shafts, the support member coupled with the support shafts based on integral formation;
    a tube supported on the support member, the tube extending along a rotation axis perpendicular to an imaginary plane including a longitudinal axis of the support shafts;
    a second hollow space extending within the tube in an axial direction of the tube, the second hollow space penetrating through at least the support member, the second hollow space being connected to the first hollow space;
    a shaft cover supported on the tube for relative rotation around the rotation axis;
    a bracket coupled to the shaft cover;
    perpendicular surfaces defined on the bearings along imaginary reference planes perpendicular to the longitudinal axis of the support shafts, respectively;
    a restriction cam coupled to the shaft cover, the restriction cam extending in a centrifugal direction of the rotation axis, the restriction cam lying inside the imaginary reference planes when the bracket takes a first attitude, the restriction cam protruding outside the imaginary reference planes when the bracket takes a second attitude established through rotation by 90 degrees around the rotation axis from the first attitude; and
    recesses formed on the perpendicular surfaces, respectively, the recesses receiving the restriction cam protruding outside the imaginary reference planes.

5. The bi-axial swivel assembly of claim 4, wherein the recesses define an enlarged section in a groove extending around the longitudinal axis of the support shafts, the groove being defined by the perpendicular surfaces.

6. A bi-axial swivel assembly comprising:
    a pair of coaxial bearings located at positions distanced from each other;
    a pair of support shafts respectively supported on the coaxial bearings for relative rotation;
    a first hollow space extending at least within one of the support shafts in an axial direction of the support shaft, the first hollow space penetrating through the bearing corresponding to the one of the support shafts;
    a support member interposed between the support shafts, the support member coupled with the support shafts based on integral formation;
    a tube supported on the support member, the tube extending along a rotation axis perpendicular to an imaginary plane including a longitudinal axis of the support shaft;

a second hollow space extending within the tube in an axial direction of the tube, the second hollow space penetrating through at least the support member, the second hollow space being connected to the first hollow space;

a bracket supported on the tube for relative rotation around the rotation axis;

perpendicular surfaces defined on the coaxial bearings along imaginary reference planes perpendicular to the longitudinal axis of the support shafts, respectively, the perpendicular surfaces configured to define a groove extending around the longitudinal axis of the support shafts;

recesses formed on the perpendicular surfaces, respectively, the recesses defining an enlarged section in the groove; and a restriction cam connected to the bracket, the restriction cam extending in a centrifugal direction of the rotation axis, the restriction cam including outward surfaces lying inside parallel imaginary reference planes extending parallel to the rotation axis when the bracket takes a first attitude, the restriction cam further including a portion protruding outside at least one of the parallel imaginary reference planes into at least one of the recesses when the bracket takes a second attitude established through rotation in either directions by 90 degrees around the rotation axis from the first attitude.

* * * * *